US012682781B2

(12) United States Patent
Hashimoto et al.

(10) Patent No.: US 12,682,781 B2
(45) Date of Patent: *Jul. 14, 2026

(54) ROBOT SYSTEM

(71) Applicant: KAWASAKI JUKOGYO KABUSHIKI KAISHA, Kobe (JP)

(72) Inventors: Yasuhiko Hashimoto, Kobe (JP); Shigetsugu Tanaka, Akashi (JP); Masayuki Kamon, Akashi (JP); Yoshihiko Maruyama, Osaka (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 172 days.

This patent is subject to a terminal disclaimer.

(21) Appl. No.: 18/739,571

(22) Filed: Jun. 11, 2024

(65) Prior Publication Data

US 2024/0331566 A1 Oct. 3, 2024

Related U.S. Application Data

(63) Continuation of application No. 17/267,642, filed as application No. PCT/JP2019/031684 on Aug. 9, 2019, now Pat. No. 12,046,148.

(30) Foreign Application Priority Data

Aug. 10, 2018 (JP) ................................. 2018-151917

(51) Int. Cl.
*G09B 19/00* (2006.01)
*B25J 9/16* (2006.01)
(Continued)

(52) U.S. Cl.
CPC ............ *G09B 19/00* (2013.01); *B25J 9/1605* (2013.01); *B25J 9/163* (2013.01); *B25J 9/1661* (2013.01);
(Continued)

(58) Field of Classification Search
None
See application file for complete search history.

(56) References Cited

U.S. PATENT DOCUMENTS 5,442,269 A * 8/1995 Takayama .............. B25J 9/1602
318/568.11
2010/0121487 A1 5/2010 Kawaguchi et al.
(Continued)

FOREIGN PATENT DOCUMENTS

CN 107921637 A 4/2018
EP 3 321 044 A1 5/2018
(Continued)

*Primary Examiner* — Dmitry Suhol
*Assistant Examiner* — Alyssa N Brandley
(74) *Attorney, Agent, or Firm* — Oliff PLC

(57) ABSTRACT

A robot system includes a robot body configured to perform a work, a robot controlling module configured to control operation of the robot body according to an operator command, a manipulator configured to send the operator command to the robot controlling module according to manipulation by an operator, a motivation information acquiring module configured to acquire motivation information for motivating the operator so that the operator increases an amount of work or a speed of work of the robot body, and a motivation information presenter configured to present to the operator the motivation information acquired by the motivation information acquiring module.

20 Claims, 10 Drawing Sheets

(51) Int. Cl.

| | |
|---|---|
| *B25J 13/00* | (2006.01) |
| *B25J 13/02* | (2006.01) |
| *B25J 13/06* | (2006.01) |
| *B25J 13/08* | (2006.01) |

(52) U.S. Cl.
CPC ........... *B25J 9/1689* (2013.01); *B25J 13/006* (2013.01); *B25J 13/02* (2013.01); *B25J 13/065* (2013.01); *B25J 13/082* (2013.01); *B25J 13/088* (2013.01)

(56) References Cited

U.S. PATENT DOCUMENTS

| | | |
|---|---|---|
| 2011/0301758 A1 | 12/2011 | Nakajima et al. |
| 2013/0338827 A1* | 12/2013 | One .................... G05B 19/423 901/41 |
| 2015/0005940 A1 | 1/2015 | Ichibangase et al. |
| 2015/0134114 A1 | 5/2015 | Tsusaka et al. |
| 2015/0314440 A1 | 11/2015 | Parker |
| 2016/0228769 A1 | 8/2016 | Mitchell et al. |

| | | |
|---|---|---|
| 2016/0260027 A1 | 9/2016 | Kuwabara et al. |
| 2016/0288322 A1 | 10/2016 | Lin et al. |
| 2017/0252924 A1 | 9/2017 | Vijayanarasimhan et al. |
| 2017/0320210 A1 | 11/2017 | Ding et al. |
| 2017/0357242 A1 | 12/2017 | Watanabe et al. |
| 2018/0029227 A1 | 2/2018 | Linnell et al. |
| 2018/0225113 A1 | 8/2018 | Hasegawa |
| 2018/0243901 A1 | 8/2018 | Hashimoto et al. |
| 2018/0243918 A1 | 8/2018 | Noguchi et al. |

FOREIGN PATENT DOCUMENTS

| | | |
|---|---|---|
| JP | S51-106455 A | 9/1976 |
| JP | H09-146624 A | 6/1997 |
| JP | 2002-108975 A | 4/2002 |
| JP | 2007-183332 A | 7/2007 |
| JP | 2009-178820 A | 8/2009 |
| JP | 2013-218585 A | 10/2013 |
| JP | 2014-219898 A | 11/2014 |
| JP | 2017-519644 A | 7/2017 |
| JP | 2018-153874 A | 10/2018 |
| KR | 1020170102485 A | 9/2017 |
| WO | 2017033356 A1 | 3/2017 |

* cited by examiner (a)

81
81a
81b
82
82a (b)

81
81a
81b
82
82a (c)

81
81a
81b
82
82a (d)

81
81a
82
82a

81b

ROBOT SYSTEM

RELATED APPLICATIONS

This application is a continuation of U.S. patent application Ser. No. 17/267,642, filed Feb. 10, 2021, which is a National Stage Entry of PCT/JP2019/031684, filed Aug. 9, 2019, which claims priority to Japanese Patent Application No. 2018-151917, filed Aug. 10, 2018. The entire contents of these prior applications are incorporated by reference herein.

TECHNICAL FIELD

The present disclosure relates to a robot system.

BACKGROUND ART

Conventionally, it is known that a robot is manipulated by an operator (for example, see Patent Document 1). In such a robot, a worker is required for learning the skill of manipulating the robot.

As a device for this purpose, for example, it is known that an operator training device technique (for example, see Patent Document 2) is used for training the manipulation of the robot.

REFERENCE DOCUMENTS OF CONVENTIONAL ART

Patent Documents

[Patent Document 1] JP2009-178820A
[Patent Document 2] JP2007-183332A

DESCRIPTION OF THE DISCLOSURE

Problems to be Solved by the Disclosure

According to the operator training device described above, the operator's manipulation capability can be evaluated. However, the training device is originally a device dedicated for training, and therefore, it cannot perform an actual work. Moreover, in the training device, since the level of an expert's manipulation capability is assumed to be an achievement point for the training of manipulation capability, it is difficult to improve the operator's manipulation capability above the assumed level.

The present disclosure is made in view of solving the above problems, and one purpose thereof is to provide a robot system capable of improving a manipulation capability of an operator through an actual work so that the operator is able to demonstrate his/her manipulation capability as much as possible.

SUMMARY OF THE DISCLOSURE

In order to achieve the purpose, a robot system according to one aspect of the present disclosure includes a robot body configured to perform a work, a robot controlling module configured to control operation of the robot body according to an operator command, a manipulator configured to send the operator command to the robot controlling module according to manipulation by an operator, a motivation information acquiring module configured to acquire motivation information for motivating the operator so that the operator increases an amount of work or a speed of the work of the robot body, and a motivation information presenter configured to present to the operator the motivation information acquired by the motivation information acquiring module. Here, the "amount of work" includes the number of given works when repeating the given work and the "speed of work" includes a required work time per unit work amount, other than a work amount per unit time.

According to this configuration, since the operator is motivated by the motivation information presented from the motivation information presenter so as to increase the work amount or the work speed of the robot body, operator's manipulation capability can be improved through the actual work so that the operator demonstrates the manipulation capability as much as possible.

The motivation information acquiring module may include a work acquiring module configured to acquire at least one of the amount of work performed by the robot body and the speed of work performed by the robot body, and a motivation information generating module configured to generate the motivation information based on at least one of the amount of work performed by the robot body and the speed of work performed by the robot body acquired by the work acquiring module.

According to this configuration, since the motivation information is generated based on at least one of the amount of work performed by the robot body and the speed of work performed by the robot body, the operator is motivated effectively so as to increase the work amount or the work speed.

The work performed by the robot body may be a given work performed repeatedly.

According to this configuration, since the given work is repeated, the operator's manipulation capability can be grasped exactly based on the work amount and the work speed.

The motivation information may include at least one of an amount of work performed by the robot body, a speed of work performed by the robot body, the number of works performed by the robot body, a yield that is the total manufacturing retail price or the total manufacturing amount of articles produced by the work performed by the robot body, a wage to be paid for the total amount of articles produced by the work performed by the robot body, a position given to the operator who has achieved a given high level in an amount of work or a speed of work performed by the robot body, a title for praising a large amount of work or a high speed of work performed by the robot body, a sound effect that changes according to the amount of work or the speed of work performed by the robot body and reminds the operator about money, an image that changes according to the amount of work or the speed of work performed by the robot body and reminds the operator about money, and a ranking of the amount of work and the speed of work performed by the robot body of arbitrary one of a plurality of robot systems.

According to this configuration, the operator is motivated exactly so as to increase the work amount or the work speed of the robot body.

A robot including the robot body and the robot controlling module may have a manual mode in which the robot controlling module controls the operation of the robot body according to the operator command, an automatic mode in which the robot controlling module controls the operation of the robot body according to a given operation program, and a correctable automatic mode in which the robot controlling module controls the operation of the robot body according to the operator command and the given operation program. The robot controlling module may correct the given operation program so as to be reflecting the operator command in the correctable automatic mode, and use the corrected given operation program thereafter in the correctable automatic mode, instead of the given operation program.

According to this configuration, the work amount and the work time (work speed) of the robot body are influenced by the selection of the operation mode of the robot, in addition to the operator's manipulation capability of the robot body. On the other hand, the operator is motivated so as to increase the work amount or the work speed of the robot body by the motivation information. As a result, the operator's manipulation capability can be improved through the actual work so that the operator demonstrates the manipulation capability as much as possible, and the selection capacity of the suitable operation mode can be improved.

The robot controlling module may include a basic operation commanding module configured to output an automatic operating command according to a basic operation program, a learning module configured to output an automatic operation correcting command based on a machine learning, and an operation commanding module configured to add the automatic operating command, the automatic operation correcting command, and the operator command, and output an operating command. The learning module may carry out the machine learning by associating a command obtained by adding the automatic operating command to the operator command, with position data of the end effector of the robot body and data of a force applied to the end effector.

According to this configuration, by this machine learning, the skill of the operator manipulating the robot body is handed down to the robot system through the actual work. Then, during this actual work, the operator is motivated by the motivation information so that he/she increases the work amount or the work speed of the robot body. As a result, the operator's more-advanced skill for manipulating the robot body is handed down to the robot system through the actual work.

The robot system may further include a work imager configured to image the work performed by the robot body, and a work image display unit configured to display a work image that is an image of the work performed by the robot body imaged by the work imager.

According to this configuration, since the operator can manipulate the robot while watching the work image displayed by the work image display unit, the work can exactly be performed by the robot body.

The robot system may further include a data-communication mechanism for performing, through a communication network, a transmission of the operator command from the manipulator to the robot controlling module, a transmission of the work image from the work imager to the work image display unit, and a transmission of the motivation information from the motivation information acquiring module to the motivation information presenter.

According to this configuration, for example, the operator can manipulate the robot body at home to make the robot body perform the work. As a result, those who can only work at home and have a special manipulation capability can also demonstrate the ability.

Effect of the Disclosure

According to the present disclosure, a robot system can be provided which is capable of improving a manipulation capability of an operator through an actual work so that the operator is able to demonstrate his/her manipulation ability as much as possible.

MODES FOR CARRYING OUT THE DISCLOSURE

Figure 1:
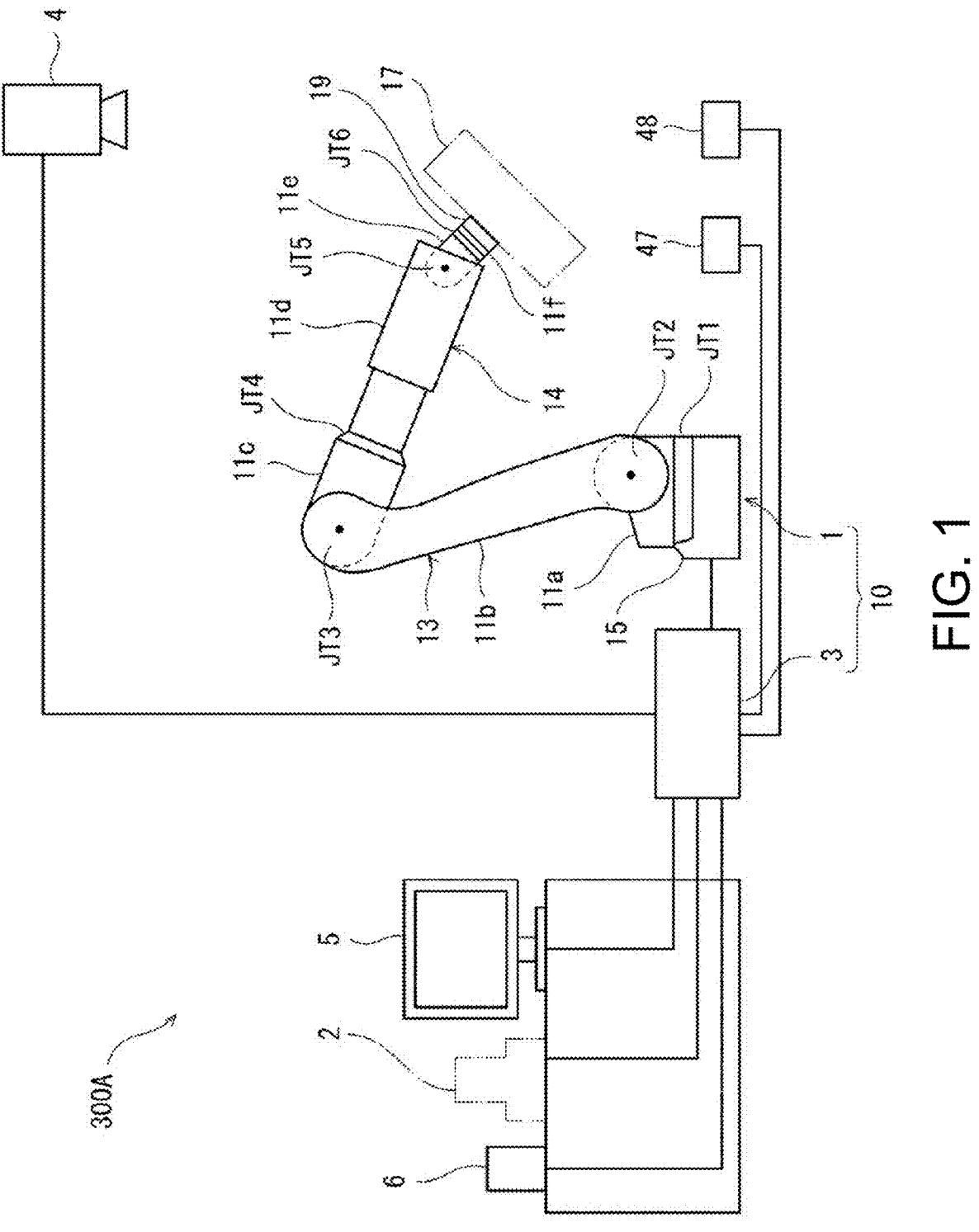
FIG. 1 is a schematic view schematically illustrating one example of a configuration of a robot system according to Embodiment 1 of the present disclosure.

Hereinafter, desirable embodiments of the present disclosure will be described with reference to the accompanying drawings. Note that, below, the same reference characters are assigned to the same or corresponding elements throughout the drawings to omit redundant description. Moreover, the present disclosure is not limited to the following embodiments.

Embodiment 1

[Configuration]

FIG. 1 is a schematic view schematically illustrating one example of a configuration of a robot system according to Embodiment 1 of the present disclosure.

{Configuration of Hardware}

Referring to FIG. 1, a robot system 300A of Embodiment 1 includes a robot body 1, a manipulator 2, a controller 3, a work imager 4, a work image display unit 5, a motivation information presenter 6, a start-of-work detector 47, and an end-of-work detector 48. The robot body 1 and the controller 3 constitute a robot 10. The robot body 1 is provided with an end effector 17. The robot body 1 may be a so-called "robot." The robot is defined as, for example, "an intelligent machine system having three elemental technologies of a sensor, an intelligence/control system, and a drive system," (see "Summary of WHITE PAPER Information and Communications in Japan," the Japanese Ministry of Internal Affairs and Communications, 2015). In detail, the robot body 1 is comprised of, for example, an industrial robot, such as a vertical articulated robot, a horizontal articulated robot, a parallel link robot, a polar coordinates robot, a cylindrical coordinates robot, and a rectangular coordinates robot. Below, a case where the robot body 1 is comprised of a robotic arm of a vertical articulated robot is illustrated.

In the robot body 1, the end effector 17 is attached to a tip end of a wrist part 14 of the robotic arm through a force sensor 19.

Below, these components are described in order.

<Work Imager>

The work imager 4 is comprised of, for example, a camera. The camera may be a known camera. The work imager 4 is installed at a location where a work performed by the robot body 1 can be imaged.

<Work Image Display Unit>

The work image display unit 5 is comprised of, for example, a display. The display may be a known display. The work image display unit 5 is installed near the manipulator 2 so that an operator is easy to see.

<Motivation Information Presenter>

The motivation information presenter 6 is an instrument which presents motivation information to the operator. The motivation information presenter 6 may be any instrument, as long as it can present the motivation information to the operator. In detail, the motivation information presenter 6 includes a speaker which presents the motivation information to the operator by sound, lighting equipment which presents the motivation information to the operator by light, a display unit which presents the motivation information to the operator by an image, and a body stimulus instrument which presents the motivation information to the operator by stimulating the operator's body (e.g., a vibrator). If the motivation information presenter 6 is a display unit, the work image display unit 5 may also serve as the motivation information presenter 6. Below, a case where the motivation information presenter 6 is the speaker is illustrated.

<Start-of-Work Detector>

In this embodiment, a given work is repeatedly performed by the robot body 1. The start-of-work detector 47 is an instrument which detects a start of the given work. Therefore, the start-of-work detector 47 is suitably configured according to the content of the given work. In this embodiment, a case where the given work is fitting of two members as will be described later is illustrated. In this case, for example, the start-of-work detector 47 is comprised of a proximity sensor, a contact sensor, etc. which detect the end effector 17 of the robot body 1 located at a given work starting position. Note that, depending on the content of the given work, the start of the given work may be detectable by a robot controlling module 41 (see FIG. 3) which will be described later, based on the position, the posture, operation, etc. of the end effector 17 of the robot body 1, and, in such a case, the robot controlling module 41 is used as the start-of-work detector 47.

<End-of-Work Detector>

The end-of-work detector 48 is suitably configured according to the content of the given work. As will be described later, if the given work is the fitting of the two members, the end-of-work detector 48 is comprised of, for example, a proximity sensor, a contact sensor, etc. which detect the end effector 17 of the robot body 1 located at a given end-of-work position. Note that, depending on the content of the given work, the robot controlling module 41 (see FIG. 3) which will be described later may be detectable of a termination of the given work, based on the position, the posture, operation, etc. of the end effector 17 of the robot body 1, and, in such a case, the robot controlling module 41 is used as the end-of-work detector 48.

<Controller>

The controller 3 includes, for example, a processor and a memory. The controller 3 controls operation of the robot body 1 by the processor reading and executing a given operation program stored in the memory. In detail, the controller 3 is comprised of, for example, a microcontroller, a MPU, an FPGA (Field Programmable Gate Array), a PLC (Programmable Logic Controller), or a logic circuit.

<Robot Body 1>

The robot body 1 includes a pedestal 15, an arm part 13 supported by the pedestal 15, and the wrist part 14 which is supported by a tip end of the arm part 13 and to which the end effector 17 is attached. As illustrated in FIG. 1, the robot body 1 is an articulated robotic arm having a plurality of (e.g., three or more) joints JT1-JT6, and it is constituted by serially coupling a plurality of links 11*a*-11*f*. In more detail, in the first joint JT1, the pedestal 15 and a base-end part of the first link 11*a* are coupled to each other rotatably on an axis extending in the vertical direction. In the second joint JT2, a tip-end part of the first link 11*a* and a base-end part of the second link 11*b* are coupled to each other rotatably on an axis extending in the horizontal direction. In the third joint JT3, a tip-end part of the second link 11*b* and a base-end part of the third link 11*c* are coupled to each other rotatably on an axis extending in the horizontal direction. In the fourth joint JT4, a tip-end part of the third link 11*c* and a base-end part of the fourth link 11*d* are coupled to each other rotatably on an axis extending in the longitudinal direction of the fourth link 11*c*. In the fifth joint JT5, a tip-end part of the fourth link 11*d* and a base-end part of the fifth link 11*e* are coupled to each other rotatably on an axis perpendicular to the longitudinal direction of the link 11*d*. In the sixth joint JT6, a tip-end part of the fifth link 11*e* and a base-end part of the sixth link 11*f* are coupled to each other rotatably in a twistable manner. Further, a mechanical interface is provided to a tip-end part of the sixth link 11*f*. The end effector 17 is attached to the mechanical interface through the force sensor 19 so as to be attachable and detachable. The end effector 17 is a tool corresponding to the content of work performed by the robot body 1. The force sensor 19 is comprised of, for example, 3-axis acceleration sensor. The force sensor 19 detects a force applied by the end effector 17 to a work target object (a reaction force from the work target object).

The arm part 13 of the robot body 1 is formed by a coupling body of the links and the joints comprised of the first joint JT1, the first link 11*a*, the second joint JT2, second link 11*b*, the third joint JT3, and the third link 11*c*. Moreover, the wrist part 14 of the robot body 1 is formed by a coupling body of the links and the joints comprised of the fourth joint JT4, the fourth link 11*d*, the fifth joint JT5, the fifth link 11*e*, the sixth joint JT6, and the fourth link 11*f*.

The joints JT1-JT6 are each provided with a drive motor (not illustrated) as one example of an actuator which relatively rotates two members coupled through the joint. The drive motor is, for example, a servomotor of which a rotation angle is controlled by an operating command (current command) sent from the robot controlling module 41 (see FIG. 3) of the controller 3. Moreover, the joints JT1-JT6 are each provided with a rotational angle sensor (not illustrated) which detects a rotation angle of the drive motor, and a current sensor (not illustrated) which detects current of the drive motor. The rotational angle sensor is comprised of, for example, an encoder.

The robot controlling module 41 of the controller 3 integrates the rotation angles of the drive motors of all the joints to convert them into position data of the end effector 17. The detection signal of the current sensor is used by the robot controlling module 41 to carry out a feedback control so that the current of the servomotor of each joint becomes a value according to the current command.

<Manipulator 2>

The manipulator 2 may be any device, as long as it can manipulate the robot body 1. For example, the manipulator 2 may be constituted by a master robot having a similar shape to the robot body 1, and the robot body 1 may be controlled as a slave robot. Alternatively, the manipulator 2 may be a joystick. Moreover, the manipulator 2 may be a manipulator for exclusive use customized by a specific application. Here, one illustrated in FIG. 2 is used as the manipulator 2.

Figure 2:
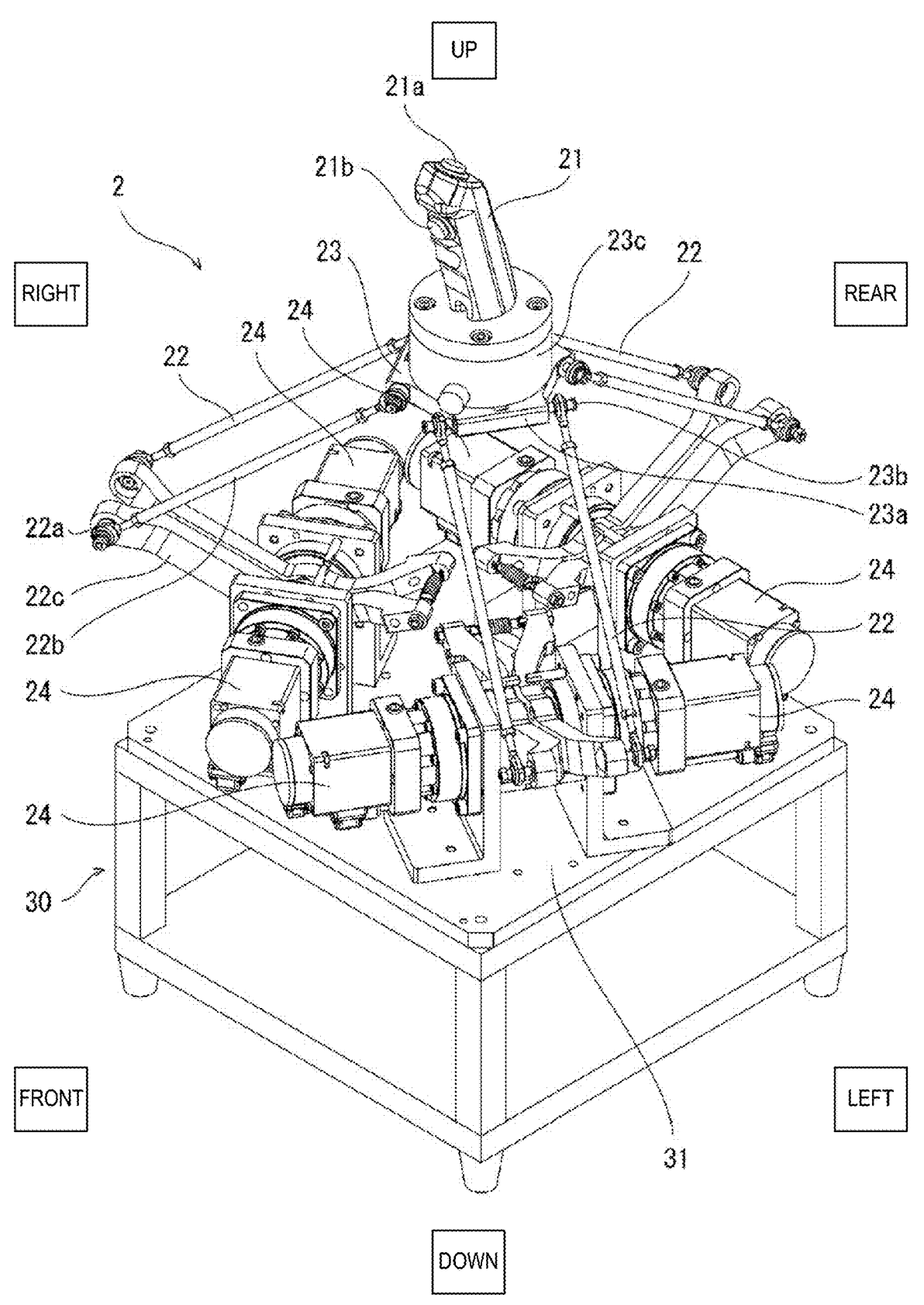
FIG. 2 is a perspective view illustrating one example of a configuration of a manipulator of FIG. 1.

FIG. 2 is a perspective view illustrating one example of a configuration of the manipulator 2 of FIG. 1. Referring to FIG. 2, the manipulator 2 includes a grip 21 which is grasped by the operator, arm parts 22 which movably support the grip 21, and motors 24. Each motor 24 is comprised of a servomotor.

The grip 21 is formed so as to be grippable and holdable by the operator to make the operator easily grasp the grip 21. By the operator moving the grip 21 while grasping and holding the grip 21, the operator moves the robot body 1 to manipulate the robot body 1.

The grip 21 is supported by a support part 23. Moreover, the grip 21 is connected to the support part 23 through a cylindrical connecting part 23*c*. The support part 23 is movably supported by the arm parts 22. Each arm part 22 is connected to the motor 24.

Each arm part 22 has a joint 22*a*, and is formed so as to be bendable centering on the joint 22*a*. Therefore, in the arm part 22, a grip-side arm part 22*b* and a motor-side arm part 22*c* are bendably connected to each other through the joint 22*a*.

The motors 24 are supported by a support table 30. Six motors 24 are provided. The six motors 24 are placed on the support table 30 in a triangular shape, where a pair of motors 24 constitute each side of the triangular shape. In more detail, the six motors 24 are disposed so that a rotation axis (center axis) of spindle of each pair of motors 24 constitutes one side of an equilateral triangle. The pair of arm parts 22 are provided corresponding to the pair of motors 24 which constitutes one side. One of three sides 23*a* which define the contour of the support part 23 is sandwiched by the pair of arm parts 22. A shaft 23*b* is disposed along the side 23*a* of the support part 23 so as to pass through the inside of the support part 23. The shaft 23*b* is held at both ends by the two grip-side arm parts 22*b* which sandwich the side 23*a*, so as to be rotatable on three axes including the center axis of the shaft 23*b*, which are perpendicular to each other. Thus, the support part 23 is supported rotatably on the three axes including the center axis of the shaft 23*b*, which are perpendicular to each other. Therefore, the support part 23 is supported by the two grip-side arm parts 22*b* so as to be rotatable on the three axes including the center axis of the shaft 23*b*, which are perpendicular to each other. The configuration of the side 23*a* and the shaft 23*b* in the support part 23 are the same for the three sides of the support part 23. Here, the center axes of the three shafts 23*b* form an equilateral triangle.

Moreover, the joint 22*a* described above connects the grip-side arm part 22*b* to the motor-side arm part 22*c* so as to be rotatable on three axes perpendicular to each other, which include an axis parallel to the center axis of the output shaft of each pair of motors 24. Therefore, the rotation angles of the six motors 24 are determined uniquely according to the position and the posture of the support part 23. The rotation angles of the six motors 24 are outputted to the controller 3 as an operator command (positional command).

Moreover, the grip 21 of the manipulator 2 is provided with push buttons 21*a* and 21*b*. These are used, for example, for manipulating the end effector 17. According to the operations of the push buttons 21*a* and 21*b*, the operator commands for manipulating the end effector 17 are outputted to the controller 3.

{Configuration of Control System}

Figure 3:
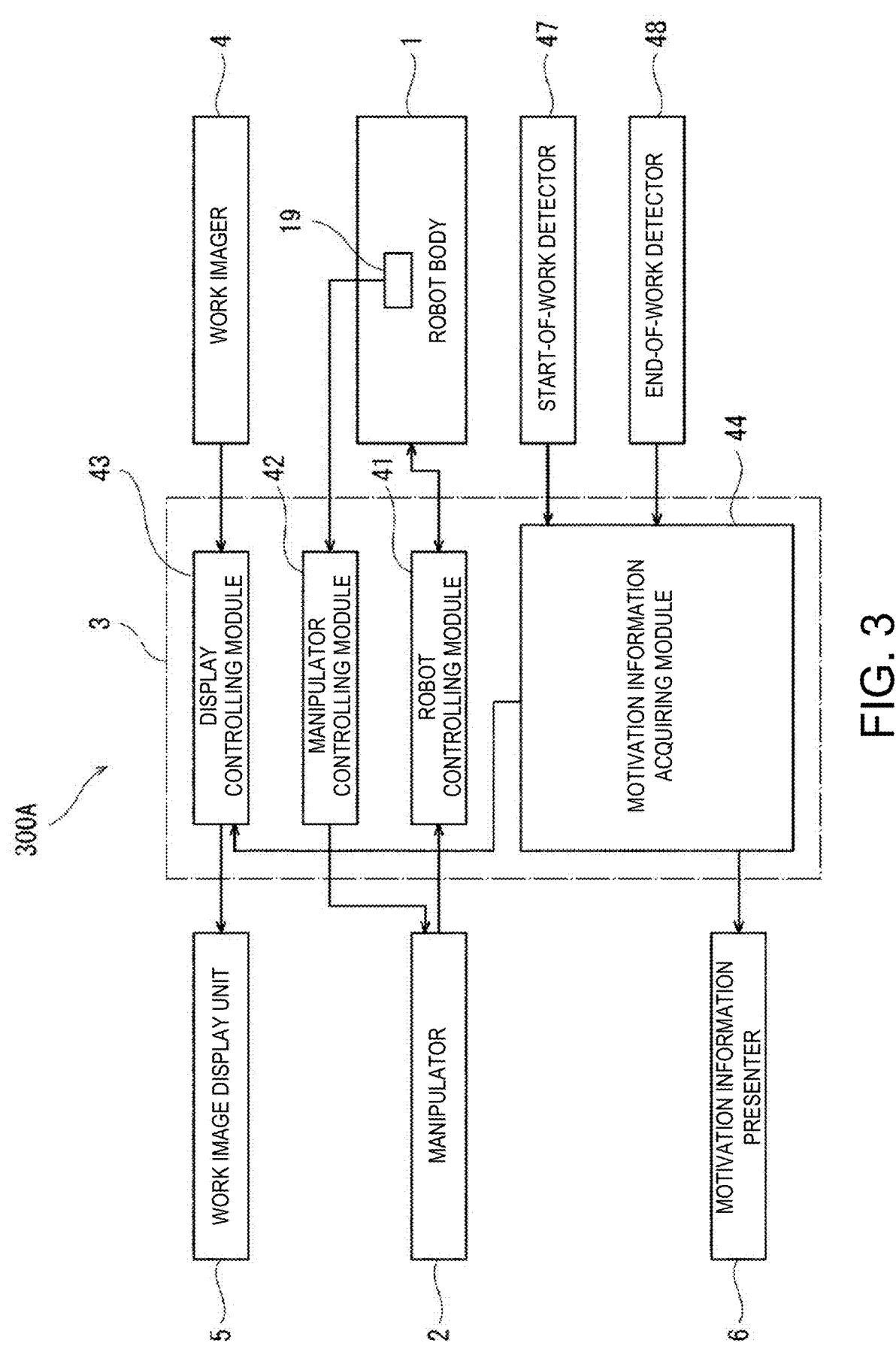
FIG. 3 is a functional block diagram illustrating one example of a configuration of a control system of the robot system of FIG. 1.

FIG. 3 is a functional block diagram illustrating a configuration of an outline of a control system of the robot system of FIG. 1.

Referring to FIG. 3, the controller 3 includes the robot controlling module 41, a manipulator controlling module 42, a display controlling module 43, and a motivation information acquiring module 44. These are functional blocks which are implemented by a processor which constitutes the controller 3 executing a given operation program stored in a memory which constitutes the controller 3.

<Display Control>

First, a control system of the work imager 4 and the work image display unit 5 is described. The controller 3 is provided with the display controlling module 43. The work imager 4 images a scene within an operating range of the robot body 1, and sends an imaging signal corresponding to the scene to the display controlling module 43. The scene of the operating range of the robot body 1 includes a situation of a work performed by the robot body 1. The display controlling module 43 converts the received imaging signal into an image display signal, and sends it to the work image display unit 5. The work image display unit 5 displays an image according to the received image display signal. Thus, the image captured by the work imager 4 is displayed on the work image display unit 5. Moreover, start-of-work information and end-of-work information are sent to the display controlling module 43 from the motivation information acquiring module 44, and the display controlling module 43 converts these information into the image display signals, and displays them on the work image display unit 5. The operator operates the manipulator 2 to manipulate the robot body 1, while watching the image displayed on the work image display unit 5.

<Operation Control of Robot Body>

Next, a control system of the manipulator 2 and the robot body 1 is described.

In this embodiment, a bilateral control is performed using the manipulator 2. In the manipulator 2, the rotation angles of the six motors 24 are controlled (position control) by the manipulator controlling module 42 of the controller 3, as needed for the bilateral control. The rotational angle sensor (not illustrated) is provided to each of the six motors 24. The rotational angle sensor is comprised of, for example, an encoder. The detection signals of the rotational angle sensors are sent to the robot controlling module 41 of the controller 3. The detection signals of the rotational angle sensors constitute the positional command of the operator command. On the other hand, the manipulator controlling module 42 of the controller 3 controls an output torque of each motor based on force data inputted from the force sensor 19 of the robot body 1. The output torque is controlled so that a reaction force according to the force data is generated against the operator's operation of the grip 21. Moreover, if the force command from the manipulator 2 is needed in the bilateral control, a force sensor (e.g., 3-axis acceleration sensor) is provided between the grip 21 and the support part 23, and the force command is generated based on the output of the force sensor. Depending on the type of bilateral control, there are a case where only the positional command constitutes the operator command, and a case where the positional command and the force command constitute the operator command. Below, the case where the operator command is constituted by the positional command is illustrated.

When manipulating the arm part 13 and the wrist part 14 of the robot body 1 by the manipulator 2, the operator grasps the grip 21. When the operator moves the grip 21 in a direction in which he/she wants to move the robot body 1 while grasping the grip 21, the support part 23 which supports the grip 21 moves together with the grip 21. Moreover, the six arm parts 22 connected to the support part 23 move together with the support part 23.

When the six arm parts 22 are moved, the output shafts of the six motors 24 rotate accordingly, and the six rotational angle sensors detect the rotation angles. The detection signals are outputted as the positional command which constitutes the operator command as described above, the robot controlling module 41 of the controller 3 generates the operating command based on the operator command (positional command), and a servo amplifier (not illustrated) converts it into current command, and sends it to the robot body 1. Then, the robot body 1 operates so that the end effector 17 becomes at a position and a posture which reflect the position and the posture of the support part 23. Therefore, the operator can operate the grip 21 of the manipulator 2 to manipulate the robot body 1 as he/she intended.

On the other hand, in the meantime, since the manipulator controlling module 42 controls each drive motor so that a reaction force according to the force data sent from the force sensor 19 of the robot body 1 is generated against the operator's operation of the grip 21, the operator senses the reaction force to the movement of the grip 21. Therefore, while the operator senses the reaction force from the work target object which acts on the end effector 17 of the robot body 1, he/she can control the position and the posture of the end effector 17.

Moreover, when the operator operates the push buttons 21*a* and 21*b* of the grip 21 of the manipulator 2, the operator commands according to these operations are transmitted to the robot controlling module 41 from the manipulator 2, and the robot controlling module 41 transmits the operating commands according to the operator commands to the robot body 1 to operate the end effector 17 according to the operator command.

<Motivation Information Presenting Control>

Next, a motivation information presenting control is described. The "motivation information" is information which motivates the operator so that the operator increases a work amount or a work speed of the robot body 1. The "work amount" includes the number of given works when repeating the given work. The "work speed" includes a required work time per unit work amount, other than a work amount per unit time. In this embodiment, the motivation information is the work amount or the work speed. Below, the work amount or the work speed may be referred to as "primary motivation information."

The controller 3 is provided with the motivation information acquiring module 44. The start-of-work detector 47 sends the start-of-work information to the motivation information acquiring module 44, when it detects the start of the given work. Moreover, the end-of-work detector 48 sends the end-of-work information to the motivation information acquiring module 44, when it detects a termination of the given work.

The motivation information acquiring module 44 calculates, for example, the number of accomplished given works based on the start-of-work information and the end-of-work information. The number is used as the work amount. Alternatively, the motivation information acquiring module 44 calculates, for example, a period of time required for accomplishing the given work based on the start-of-work information and the end-of-work information. Then, an average number of given works per unit time, or an average period of time (duration) per given work is calculated, and it is used as the work speed.

The motivation information acquiring module sends the work amount or the work speed calculated in this way to the motivation information presenter 6.

Here, the motivation information presenter 6 is a speaker, and it voice-notifies (presents) the operator about the received work amount or the received work speed. For example, the motivation information presenter 6 notifies the operator about "N (N is a positive number) times," "N (N is a positive number) minutes per work," or "N (N is a positive number) times per minute."

Operation

Figure 4:
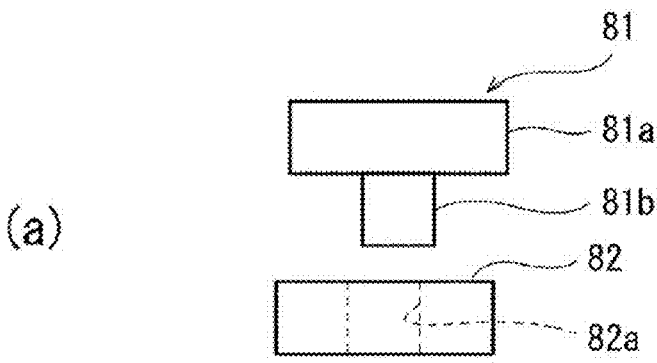
FIGS. 4(*a*) to 4(*d*) are schematic views schematically illustrating one example of a work performed by a robot body of the robot system of FIG. 1.
Figure 4:
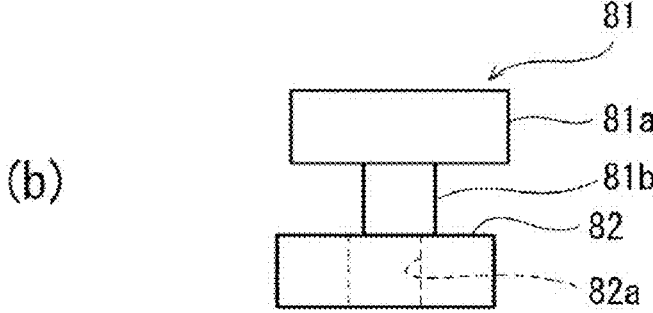
Figure 4:
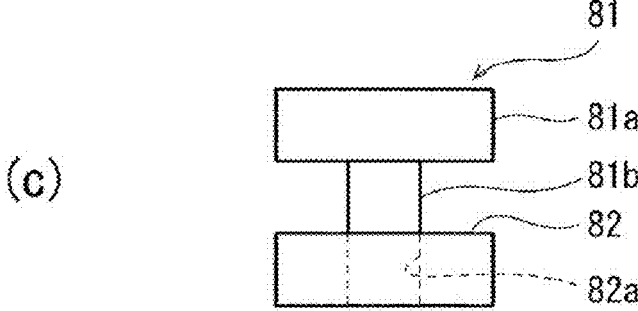
Figure 4:
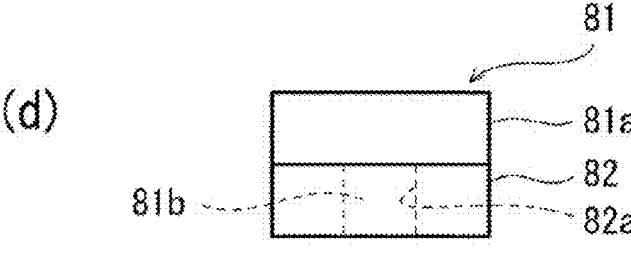
Figure 5:
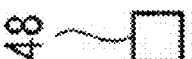
FIG. 5 is a plan view schematically illustrating one example of a work environment of the work performed by the robot body of the robot system of FIG. 1.
Figure 5:
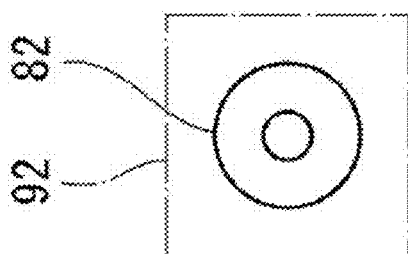
Figure 5:
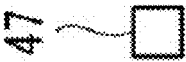
Figure 5:
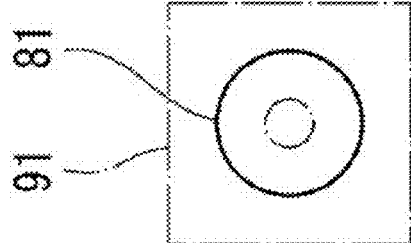

Next, one example of operation of the robot system 300A configured as described above is described with reference to FIGS. 4 and 5. FIGS. 4(*a*) to 4(*d*) are schematic views schematically illustrating one example of the work performed by the robot body of the robot system of FIG. 1. FIG. 5 is a plan view schematically illustrating one example of a work environment of the work performed by the robot body of the robot system of FIG. 1.

<Work Target Object and Content of Work>

Here, the given work is performed repeatedly. When the given work is repeated, the operator's manipulation capability can be grasped exactly based on the work amount (the number of given works (the number of repetition)) and the work speed.

The work target object is comprised of, for example, two articles which fit to each other. FIGS. 4(*a*) to 4(*d*) illustrate a situation where the robot body 1 fits a first article 81 into a second article 82, while groping for the second article 82 with the first article 81.

Here, operation of the robot system 300A is described by one example of fitting the first article 81 having a cylindrical short head part 81*a* with a large diameter and a cylindrical long body 81*b* with a small diameter, into the second article 82 having a cylindrical through-hole 82*a* in a center part of a short cylindrical body. In this case, the body 81*b* of the first article 81 is fitted into the through-hole 82*a* of the second article 82. However, since a gap between both articles is small, a great deal of skill is required for the operator to manipulate the robot body 1 by using the manipulator 2 to smoothly fit one to the other.

<Work Environment>

The end effector 17 of the robot body 1 is provided with a chuck (not illustrated) which is capable of holding and releasing the head part 81*a* of the first article 81. Here, the start-of-work detector 47 and the end-of-work detector 48 are comprised of proximity sensors.

Referring to FIG. 5, for example, a first location 91 and a second location 92 are set so as to be separated from each other by a given distance in a given work area. The first article 81 is placed at the first location 91, and the second article 82 is placed at the second location 92. The start-of-work detector 47 is provided near the first location 91, and the end-of-work detector 48 is provided near the second location 92. When the end effector 17 of the robot body 1 is located directly above the start-of-work detector 47, the start-of-work detector 47 detects a start of work, and thereby, a first article feed mechanism (not illustrated) newly places the first article 81 at the first location 91. Moreover, when the end effector 17 of the robot body 1 is located directly above the end-of-work detector 48, the end-of-work detector 48 detects an end of work, and thereby, a second article feed and take-out mechanism (not illustrated) takes out from the second location 92 the second article 82 into which the first article 81 fitted, and newly places the second independent article 82 at the second location 92. The first article feed mechanism and the second article feed and take-out mechanism are constituted by, for example, an industrial robot or a belt conveyor.

<Fitting Work>

Referring to FIGS. 1, 3, and 4, the operator operates the manipulator 2 to manipulate the robot body 1 as follows, while watching the work image display unit 5. Below, in order to simplify description, description of the operator operating the manipulator 2 while watching the work image display unit 5, and description of the robot body 1 operating accordingly, are omitted.

First, the operator causes the end effector 17 to grasp the first article 81 placed at the first location 91.

Next, the operator causes the end effector 17 to locate directly above the start-of-work detector 47. Then, the start-of-work detector 47 detects the start of work, and it sends the start-of-work information to the motivation information acquiring module 44.

The motivation information acquiring module 44 sends the received start-of-work information to the display controlling module 43 and starts a measurement of the work time. Note that, in this case, although a period of time required for grasping the first article 81 and conveying it above the start-of-work detector 47 is not included in the work time, since the work time is originally an index for motivating the operator to increase the work amount or the work speed, the actual work time may not be correctly reflected in the measured work time, as long as a measurement method is defined.

When the display controlling module 43 receives the start-of-work information, it displays on the work image display unit 5 a message indicating that the work is started so as to be superimposed on an image of the work. Thus, the operator confirms that the start of work is recognized by the robot 10 and the measurement of the work time is started.

On the other hand, when the start-of-work detector 47 detects the start of work, the first article feed mechanism newly places the first article 81 at the first location.

Next, as illustrated in FIGS. 4(*a*) to 4(*d*), the operator causes the end effector 17 to place the first article 81 grasped by the end effector 17 above the second article 82. In this case, for example, the first article 81 is not correctly located directly above the second article 82, and it is deviated to horizontal position (it is slightly deviated to the right in FIGS. 4(*a*) to 4(*d*)).

Next, the operator lowers the first article 81 grasped by the end effector 17. Then, as illustrated in FIG. 4(*b*), the body 81*b* of the first article 81 contacts an edge of the through-hole 82*a* of the second article 82. The operator not only visually senses this contact through the work image display unit 5, but senses it by a reaction force from the manipulator 2.

Then, as illustrated in FIGS. 4(*c*) and 4(*d*), the operator moves the body 81*b* of the first article 81 grasped by the end effector 17 so that it gropes for the edge of the through-hole 82*a* of the second article 82, and eventually fits the body 81*b* of the first article 81 into the through-hole 82*a* of the second article 82. In this fit-in operation, the body 81*b* of the first article 81 is moved while being lightly pressed against the second article 82 to explore the position of the through-hole 82*a* of the second article 82, and when the position of the body 81*b* of the first article 81 matches up with the position of the through-hole 82*a* of the second article 82, the body 81*b* of the first article 81 begins to be inserted into the through-hole 82*a* of the second article 82 by the pressing force. However, since the operator can sense that the body 81*b* of the first article 81 begins to be inserted into the through-hole 82*a* of the second article 82 by the pressing force, based on the reaction force from the manipulator 2, he/she can suitably perform the fit-in operation.

Next, the operator causes the end effector 17 to release the first article 81 grasped by the end effector 17, and causes the end effector 17 to be located above the end-of-work detector 48. Then, the end-of-work detector 48 detects the end of work, and it sends the end-of-work information to the motivation information acquiring module 44.

The motivation information acquiring module 44 sends the received end-of-work information to the display controlling module 43, ends the measurement of the work time, and calculates the work time of this time (e.g., 55 seconds). Then, for example, it sends voice information including "one time (one work)" and "55 seconds per work" to the motivation information presenter 6 as the motivation information.

When the display controlling module 43 receives the end-of-work information, it displays on the work image display unit 5 a message indicating that the work is finished so as to be superimposed on the image of the work. Therefore, the operator confirms that the termination of work is recognized by the robot 10.

Moreover, when the motivation information presenter 6 receives the voice information, it notifies the operator about information including "one time (one work)" and "55 seconds per work" by voice.

On the other hand, when the end-of-work detector 48 detects the end of work, the second article feed and take-out mechanism takes out from the second location 92 the second article 82 into which the first article 81 fitted, and newly places the second independent article 82 at the second location 92.

Henceforth, this operation is repeated. In this case, the voice information described above is voice information including "N times (N works)" and "T seconds per work." "N" is the number of works (the number of repetition), and "T" is the work time for this work.

Operation and Effects

When the operator hears the voice information notified by the motivation information presenter 6, he/she is motivated so as to increase the work amount (number of works) or the work speed. In detail, the operator has a target number of works and a target work speed for the work in a given period of time based on his/her current capability. Moreover, the operator is always eager to improve the work. Therefore, if the notified number of works or work speed exceed the target number of works or the target work speed, he/she can be sure of the working method he/she tried in the work being suitable, and therefore, he/she adopts the same method for the next time. Moreover, the operator is motivated by having obtained the good result.

On the other hand, if the notified number of works or work speed is below the target number of works or the target work speed, the operator insists himself/herself making up for the delay. Moreover, the operator is going to study the causes of the result being below the target number of works or the target work speed, and is then going to improve the work by removing the causes.

Thus, the operator is motivated so as to increase the work amount (number of works) or the work speed.

As described above, according to Embodiment 1, since the operator is motivated by the motivation information presented from the motivation information presenter 6 so as to increase the work amount (number of works) or the work speed, the operator's manipulation capability can be improved through the actual work so that the operator demonstrates the manipulation capability as much as possible.

Since the operator can manipulate the robot body 1 while watching the work performed by the robot body 1 which is displayed on the work image display unit 5, he/she can manipulate the robot body exactly also in a work environment in which the detailed content of the work cannot be visually monitored by naked eyes.

Embodiment 2

Embodiment 2 of the present disclosure is different from Embodiment 1 in that the motivation information is secondary motivation information which is derived from the primary motivation information (work amount or work speed), and it is the same as Embodiment 1 in other configurations. Below, the difference is described.

Figure 6:
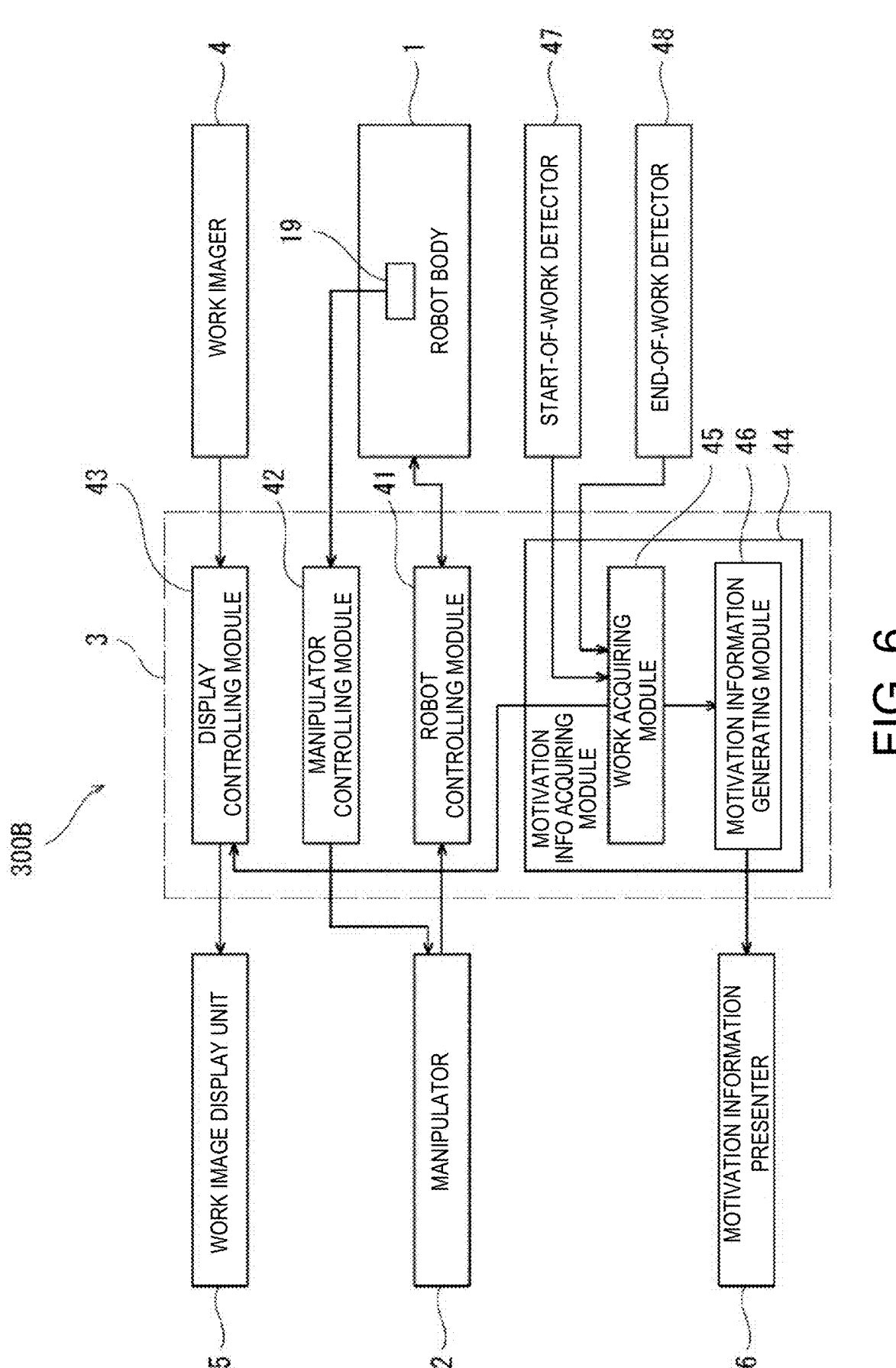
FIG. 6 is a functional block diagram illustrating one example of a configuration of a control system of a robot system according to Embodiment 2 of the present disclosure.

FIG. 6 is a functional block diagram illustrating one example of a configuration of a control system of a robot system according to Embodiment 2 of the present disclosure.

Referring to FIG. 6, in a robot system 300B of Embodiment 2, the motivation information acquiring module 44 includes a work acquiring module 45 and a motivation information generating module 46. Moreover, the motivation information presenter 6 is comprised of a speaker, a display unit, or a body stimulus instrument according to the type of motivation information.

The work acquiring module 45 receives the start-of-work information from the start-of-work detector 47 and receives the end-of-work information from the end-of-work detector 48. Then, similar to the motivation information acquiring module 44 of Embodiment 1, the work acquiring module 45 sends the received start-of-work information and the received end-of-work information to the display controlling module 43, and calculates the accomplished number of given works and work speed (here, the work time) based on the start-of-work information and the end-of-work information. Then, the work acquiring module 45 sends the calculated number of given works and work speed to the motivation information generating module 46.

Based on the received number of given works and work speed, the motivation information generating module 46 generates the secondary motivation information which is derived from the number of given works (work amount) and the work speed, and sends the generated secondary motivation information to the motivation information presenter 6. Note that, in addition to the secondary motivation information, the motivation information generating module 46 may send the primary motivation information (at least either the number of given works or the work speed) to the motivation information presenter 6.

Here, the secondary motivation information is described in detail. Note that, in the following, the term "given work" is "a work performed by the robot body 1."

The secondary motivation information includes one or a combination of a score corresponding to the amount (number) of given work(s) or the speed of the given work, a yield which is the total manufacturing retail price or the total manufacturing amount of the articles produced by the given work, a wage to be paid for the total amount of articles produced by the given work, a position (post) given to an operator who has achieved a given high level in the number of given works and the work speed, a title for praising the high number of given works and work speed, and a word or phrase for admiring the high number of given works and work speed, a sound effect (onomatopoeia) which changes according to the number of given works and the work speed and reminds the operator about money, and an image which changes according to the number of given works and the work speed and reminds the operator about money.

The yield includes "manufacturing amount N (N is quantity) pieces" and "manufacturing retail price F (F is an amount of money) JPY."

The wage includes "wage F (F is an amount of money) JPY."

The position includes "EXPERT," "MEISTER," and "BOSS."

The title includes "KING," "KING," "CHAMPION," "EMPEROR," "EXPERT," and "TOP OF (SOMETHING)."

The admiring word or phrase includes "AMAZING!," "WONDERFUL!," "HIGH SPEED!," "GREAT!," "AWESOME!," "OMG!," "WOW," "MR. PRESIDENT!," and "NEVER SEEN THIS BEFORE!."

The sound effect which reminds the operator about money includes "clink" which is a dropping sound of a coin, and "jingling" which is a sound when coins are chafing each other.

The image which reminds the operator about money includes "an image of a bundle of bills," "an image of a bill," "an image of a gold coin," "an image of a gold nugget," and "an image of a diamond."

The position, the title, the word or phrase for admiring the operator, the sound effects which remind the operator about money, and the image which reminds the operator about money are generated, for example, when the number of given works or the work speed exceeds a given level.

Alternatively, for example, a plurality of levels may be set for the number of given works or the work speed, and the secondary motivation information may be generated according to the plurality of levels.

The motivation information presenter 6 presents the operator the received motivation information (the primary motivation information and/or the secondary motivation information).

According to Embodiment 2, since the operator is more strongly motivated by the secondary motivation information so that he/she increases the work amount or the work speed of the robot body 1 than by the primary motivation information simply indicative of the work amount or the work speed, the operator can further demonstrate his/her manipulation capability.

Embodiment 3

Embodiment 3 of the present disclosure is different from Embodiment 2 in that the motivation information includes comparison information with other operators (robot system), and it is the same as Embodiment 2 in other configurations. Below, the difference is described.

Figure 7:
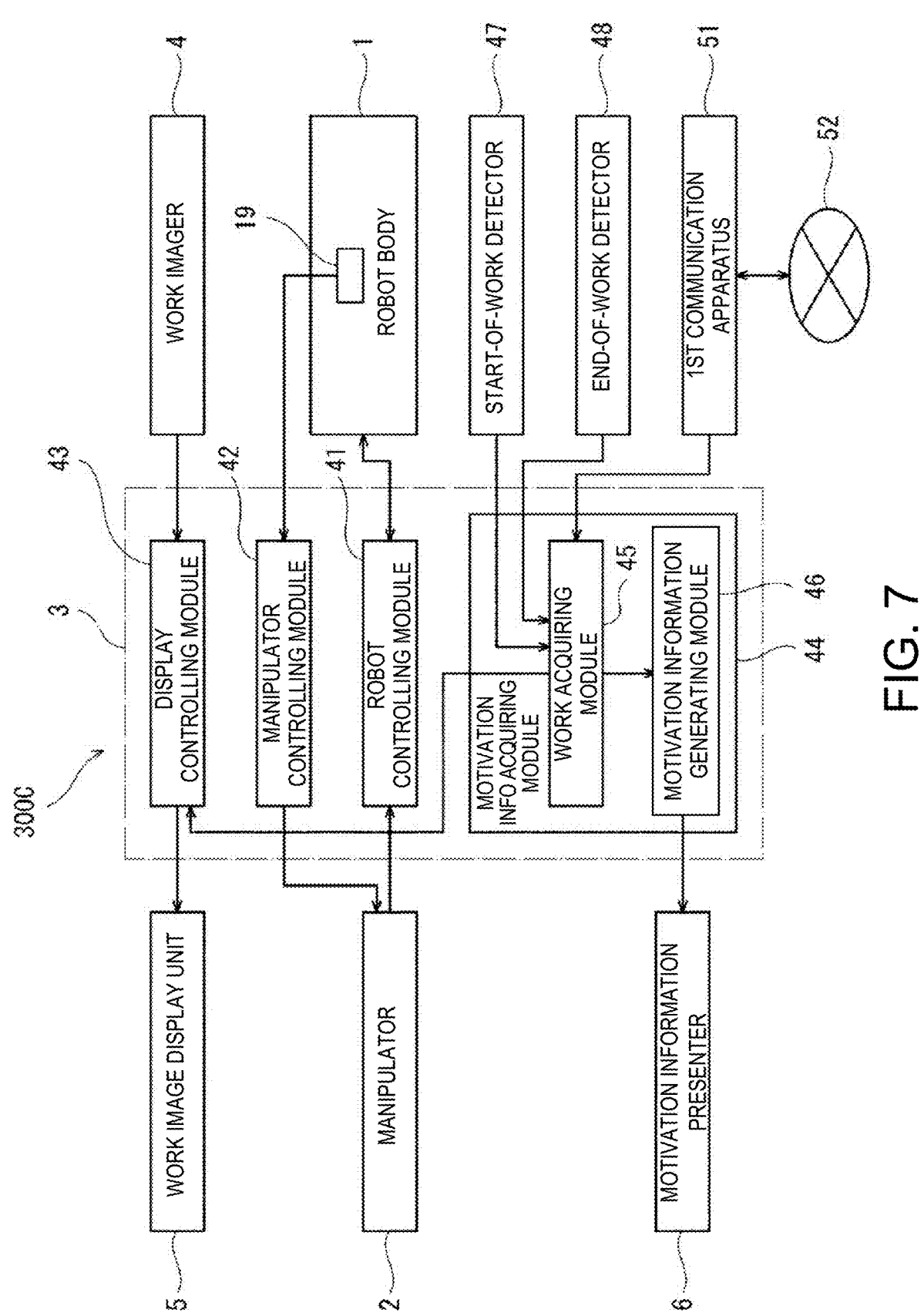
FIG. 7 is a functional block diagram illustrating one example of a configuration of a control system of a robot system according to Embodiment 3 of the present disclosure.

FIG. 7 is a functional block diagram illustrating one example of a configuration of a control system of a robot system according to Embodiment 3 of the present disclosure.

Referring to FIG. 7, a robot system 300C of this embodiment is further provided with a first communication apparatus 51. The first communication apparatus 51 is electrically connected to the work acquiring module 45 of the controller 3. The first communication apparatus 51 is also connected to a communication network 52 through which data communication is possible. The communication network 52 is connected to first communication apparatuses 51 of a plurality of other robot systems 300C (not illustrated). In each of the plurality of other robot systems 300C, a given work is performed similar to the robot system of this embodiment. Here, although the communication network 52 is LAN (Local Area Network), it may be the Internet.

The first communication apparatus 51 receives the number of given works and the work speed from the work acquiring module 45, converts them into communication data of a given protocol, and transmits it to the first communication apparatuses 51 of other robot systems 300C through the communication network 52. Moreover, the first communication apparatus 51 receives communication data including the number of given works and the work speed from each of the first communication apparatuses 51 of other robot systems 300C through the communication network 52, converts it into the number of given works and the work speed, and sends them to the work acquiring module 45. This communication is performed on real time at every moment.

The work acquiring module 45 sends the received numbers of given works and work speeds of other robot systems 300C to the motivation information generating module 46.

The motivation information generating module 46 calculates a ranking of the number of given works and the work speed of the robot system 300C to which this system belongs among all the robot systems 300C, based on the received numbers of given works and work speeds of other robot systems 300C and the number of given works and the work speed to which this system belongs, and uses the ranking as the motivation information.

That is, in addition to the secondary motivation information described in Embodiment 2, the motivation information generating module 46 of this embodiment generates the ranking of the number of given works and the work speed of the robot system 300C to which this system belongs among all the robot systems 300C, as the secondary motivation information.

The ranking of the number of given works and the work speed are sent to the motivation information presenter 6, and the motivation information presenter 6 presents to the operator the ranking. Then, the operator becomes competitive, and he/she is more strongly motivated so as to increase the work amount or the work speed of the robot body 1. As a result, the operator can further demonstrate his/her manipulation capability.

Embodiment 4

Embodiment 4 of the present disclosure is different from Embodiment 2 in that, among the components of the robot system, the manipulator, the work image display unit, and the motivation information presenter are connected with other components through a communication network, and it is the same as Embodiment 2 in other configurations. Below, the difference is described.

Figure 8:
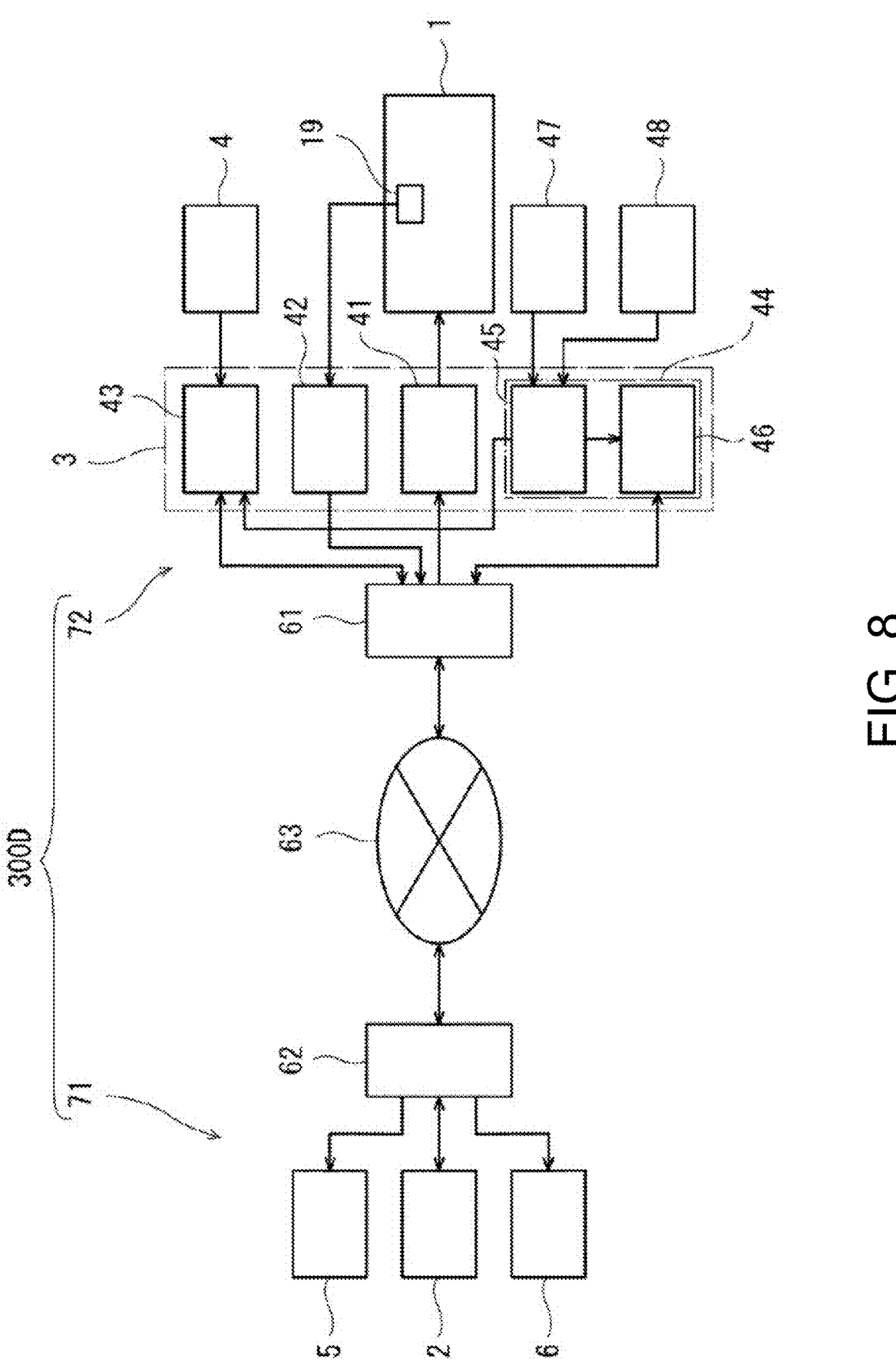
FIG. 8 is a functional block diagram illustrating one example of a configuration of a control system of a robot system according to Embodiment 4 of the present disclosure.

FIG. 8 is a functional block diagram illustrating one example of a configuration of a control system of a robot system according to Embodiment 4 of the present disclosure.

Referring to FIG. 8, a robot system 300D of this embodiment is further provided with a second communication apparatus 61 and a third communication apparatus 62. The second communication apparatus 61 and the third communication apparatus 62 constitute a data-communication mechanism.

The robot system 300D is divided into a manipulation instrument group 71 and a work instrument group 72. The manipulation instrument group 71 includes the manipulator 2, the work image display unit 5, the motivation information presenter 6, and the third communication apparatus 62. The work instrument group 72 includes the controller 3, the robot body 1, the work imager 4, the start-of-work detector 47, the end-of-work detector 48, and the second communication apparatus 61.

The second communication apparatus 61 is electrically connected to the robot controlling module 41, the manipulator controlling module 42, the display controlling module 43, and the motivation information generating module 46 of the controller 3. The second communication apparatus 61 is also connected to a communication network 63 through which data communication is possible. The third communication apparatus 62 is connected to the manipulator 2, the work image display unit 5, and the motivation information presenter 6. The third communication apparatus 62 is connected to the communication network 63. Here, although the communication network 63 is the Internet, it may be LAN.

In detail, the second communication apparatus 61 converts each of the control signal from the manipulator controlling module 42 of the controller 3, the image display signal from the display controlling module 43, and the motivation information from the motivation information generating module 46 into communication data of a given protocol, and transmits them to the third communication apparatus 62 through the communication network 63. Moreover, the second communication apparatus 61 receives communication data including the operator command from the third communication apparatus 62 through the communication network 63, converts it into the operator command, and sends it to the robot controlling module 41.

The third communication apparatus 62 converts the operator command from the manipulator 2 into the communication data of a given protocol, and transmits it to the second communication apparatus 61 through the communication network 63. Moreover, the third communication apparatus 62 receives the communication data including the control signal, the communication including the image display signal, and the communication data including the motivation information, from the second communication apparatus 61 through the communication network 63, and converts them into the control signal, the image display signal, and motivation information, respectively, and sends them to the manipulator 2, the work image display unit 5, and the motivation information presenter 6, respectively.

Here, for example, the work instrument group 72 is provided at a factory, and the manipulation instrument group 71 is provided at an operator's house.

According to Embodiment 4 configured in this way, the operator can manipulate the robot body 1 at home to make the robot body 1 perform the work. As a result, those who can only work at home and have a special manipulation capability can also demonstrate the ability.

Embodiment 5

Embodiment 5 of the present disclosure is different from Embodiment 1 in that the robot 10 is provided with an automatic mode and a correctable automatic mode, as operation modes, other than a manual mode (a mode in which the robot 10 is manipulated by the operator), and it is the same as Embodiment 1 in other configurations. Below, the difference is described.

Figure 9:
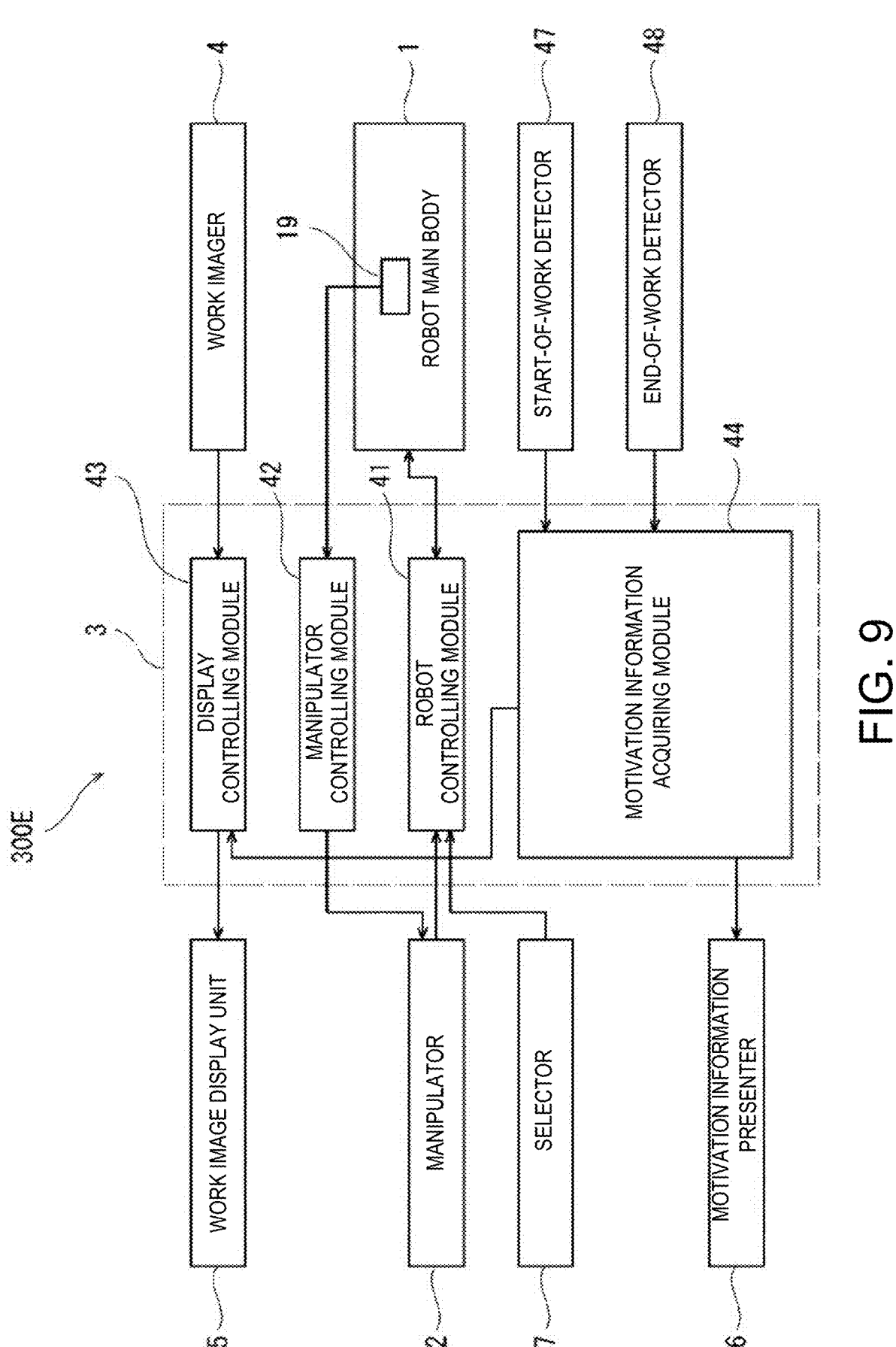
FIG. 9 is a functional block diagram illustrating one example of a configuration of a control system of a robot system according to Embodiment 5 of the present disclosure.
Figure 10:
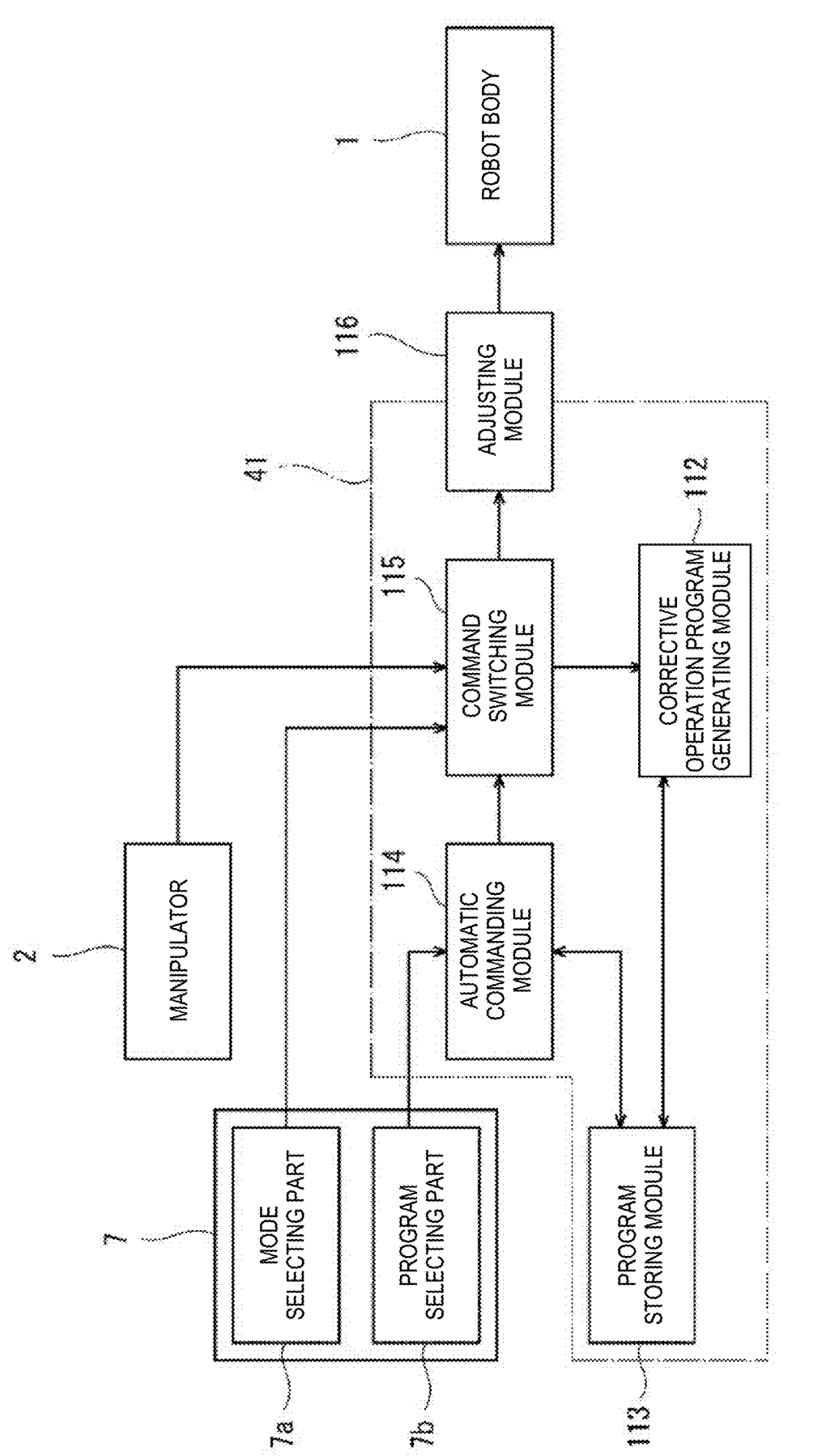
FIG. 10 is a functional block diagram illustrating one example of a detailed configuration of a selector and a robot controlling module of FIG. 9.

FIG. 9 is a functional block diagram illustrating one example of a configuration of a control system of a robot system according to Embodiment 5 of the present disclosure. FIG. 10 is a functional block diagram illustrating one example of a detailed configuration of a selector and a robot controlling module of FIG. 9. In FIG. 10, arrows indicate a command, a signal, or data (including a program). Since it is apparent from description of each functional block what these arrows indicate, an assignment of reference characters is omitted.

Referring to FIG. 9, a robot system 300E of this embodiment is provided with a selector 7. Referring to FIG. 10, the selector 7 includes a mode selecting part 7a and a program selecting part 7b.

The robot controlling module 41 includes a corrective operation program generating module 112, a program storing module 113, an automatic commanding module 114, a command switching module 115, and an adjusting module 116. Moreover, the adjusting module 116 includes a controller (not illustrated) and a servo amplifier (not illustrated).

The selector 7 is comprised of a data input device, and, for example, is comprised of a touch panel, an adjustment knob, a manual operation button, a control lever, or an information terminal such as a tablet. The mode selecting part 7a is selectable of any one of the automatic mode, the correctable automatic mode, and the manual mode by being operated by the operator. The program selecting part 7b is selectable of a program stored in the program storing module 113 by being operated by the operator.

The corrective operation program generating module 112, the automatic commanding module 114, the command switching module 115, and the controller of the adjusting module are functional blocks which are implemented by the processor which constitutes the controller 3 executing a given operation program stored in the memory which constitutes the controller 3. The program storing module 113 is comprised of the memory which constitutes the controller 3.

The program storing module 113 stores an original operation program and one or more corrective operation programs which are obtained by correcting the original operation program.

The automatic commanding module 114 reads the operation program selected by the program selecting part from the program storing module 113, and outputs an automatic operating command according to the read operation program.

The command switching module 115 switches between the automatic operating command and the operator command outputted from the manipulator 2, according to the mode selected by the mode selecting part 7a, and outputs an operating command. In detail, when the automatic mode is selected by the mode selecting part 7a, the command switching module 115 outputs the automatic operating command as the operating command. When the correctable automatic mode is selected by the mode selecting part 7a, the command switching module 115 outputs what obtained by adding the operator command to the automatic operating command, as the operating command. Moreover, the operating command is sent to the corrective operation program generating module 112. When the manual mode is selected by the mode selecting part 7a, the command switching module 115 outputs the operator command as the operating command.

The controller of the adjusting module 116 generates a control signal according to the operating command outputted from the command switching module 115 and a rotation angle (not illustrated) which is fed back from the robot body 1. The servo amplifier of the adjusting module 116 outputs a current command according to the control signal and a current value fed back from the robot body 1 to the servomotor of each joint of the robot body 1. Therefore, the robot body 1 operates according to the operating command. Note that the rotation angle and the current value which are fed back from the robot body 1 are a rotation angle and a current value of the servomotor which drives each joint of the robot body 1.

The corrective operation program generating module 112 corrects the operation program read by the automatic commanding module 114 so that it becomes what reflected the operating command sent from the command switching module 115 to generate the corrective operation program, and stores it in the program storing module 113.

Next, operation of the robot system of this embodiment configured as described above is described as the example of the fitting work in Embodiment 1.

The original operation program is created so that, after the robot body 1 grasps the first article 81, moves the end effector 17 above the start-of-work detector 47, and conveys the first article directly above the second article 82, the robot body 1 lowers the end effector 17 to fit the first article 81 into the second article 82, and then releases the first article 81 and moves the end effector 17 above the end-of-work detector 48. Moreover, in the automatic mode, when the force detected by the force sensor 19 exceeds a given threshold, the robot 10 stops to become in a signal waiting state, and in this state, when a mode selection signal is outputted from the mode selecting part 7a, the robot 10 operates in an operation mode according to the mode selection signal.

Here, it is assumed that, if the robot body 1 is operated according to the original operation program, the dimensions of the first article 81 and the second article 82 are substantially at the center values of their tolerances, and if a conveyance error of the first article 81 by the robot body 1 is very small, the fitting of the first article 81 into the second article 82 will be successful. Moreover, it is assumed that one corrective operation program is stored in the program storing module 113, and this corrective operation program is addressable to a situation where the position of the first article 81 is slightly deviated from directly above the second article 82 to the right in FIG. 4(a).

Below, the operation of the robot body 1 is described with reference to FIGS. 9 and 10, independently for each of the concrete cases.

\<Manual Mode\>

When the operator selects the manual mode, since the command switching module 115 outputs the operator command outputted from the manipulator 2 as the operating command, the robot body 1 operates according to the operation of the manipulator 2. Therefore, in this case, similar results to Embodiment 1 can be obtained.

<Automatic Mode→Original Operation Program is Selected>

When the operator operates the mode selecting part 7*a* to select the automatic mode, and operates the program selecting part 7*b* to select an original operation program, and, for example, if the dimension of the first article 81 is at an upper limit of the tolerance and the dimension of the second article 82 is at a lower limit of the tolerance, or if the conveyance error of the first article 81 by the robot body 1 is considerably large, the body 81*b* of the first article 81 contacts the edge of the through-hole 82*a* of the second article 82 as the robot body 1 lowers the first article 81 toward the second article 82. Then, the robot 10 stops and becomes in the signal waiting state. In this state, when the operator selects the manual mode, the robot body 1 operates according to the operation of the manipulator 2. The operator operates the manipulator 2 to finish the remaining fitting work by the robot body 1.

<Automatic Mode→Corrective Operation Program is Selected>

In this case, in FIG. 4(*a*), when the position of the first article 81 is slightly deviated from directly above the second article 82 to the right, the robot body 1 performs the groping according to the corrective operation program, and automatically finishes the remaining fitting work.

On the other hand, in FIG. 4(*a*), when the position of the first article 81 is slightly deviated from directly above the second article 82 in a direction other than the right, the robot 10 stops again and becomes in the signal waiting state. In this case, when the operator selects the manual mode, the operator operates the manipulator 2 to finish the remaining fitting work by the robot body 1. On the other hand, in this case, when the correctable automatic mode is selected, it will become similar to the following case.

<Correctable Automatic Mode→Original Operation Program is Selected>

In this case, similar to "Automatic Mode→Original Operation Program is Selected," if the dimension of the first article 81 is at the upper limit of the tolerance and the dimension of the second article 82 is at the lower limit of the tolerance, or if the conveyance error of the first article 81 by the robot body 1 is considerably large, since the body 81*b* of the first article 81 contacts the edge of the through-hole 82*a* of the second article 82 as the robot body 1 lowers the first article 81 toward the second article 82, the operator then operates the manipulator 2 to finish the remaining fitting work by the robot body 1. Note that since the corrective operation program generating module newly generates the corrective operation program based on the operating command at this time and stores it in the program storing module 113, the efficiency of the fitting work improves by selecting the corrective operation program thereafter.

<Correctable Automatic Mode→Corrective Operation Program is Selected>

In this case, if the fitting work can be handled by the selected corrective operation program, the fitting work is automatically carried out by the robot body 1. On the other hand, if the fitting work cannot be handled by the selected corrective operation program, the operator carries out the fitting work, while operating the manipulator 2 to correct the operation of the robot body 1 by the corrective operation program. Also in this case, since a corrective operation program is newly generated based on the operating command at this time, and is stored in the program storing module 113, the efficiency of the fitting work improves by selecting the corrective operation program thereafter.

<Operation and Effects of Motivation Information>

For each fitting work described above, the work amount (number of works) and the work time (work speed) of the robot body 1 are calculated similar to Embodiment 1, and the motivation information is generated based on the calculation to be presented to the operator.

In this case, the work amount (number of works) and the work time (work speed) of the robot body 1 are influenced by the selection of the operation mode and the program, in addition to the operator's manipulation capability of the robot body 1.

On the other hand, the operator is motivated so as to increase the work amount or the work speed of the robot body 1 by the motivation information presented from the motivation information presenter 6. In this case, the operator tries to increase the work amount of the robot body 1 or shorten the work time of the robot body 1 by appropriately selecting the operation mode and the program, in addition to trying to successfully manipulate the robot body 1. As a result, the operator's manipulation capability can be improved through the actual work so that the operator demonstrates the manipulation capability as much as possible, and the selection capacity of the suitable operation mode can be improved.

Embodiment 6

In Embodiment 6 of the present disclosure, the robot 10 of Embodiment 5 has only the correctable automatic mode, and the robot controlling module 41 of Embodiment 5 is provided with a learning module which carries out a machine learning of the operator command, instead of the corrective operation program generating module 112 and the program storing module 113. In more detail, in the robot system 300E of Embodiment 5, the selector 7 is eliminated, and the automatic commanding module 114 functions as a "basic operation commanding module," stores a basic operation program, and outputs the automatic operating command according to this basic operation program. The command switching module 115 functions as an "operation commanding module," and outputs a command obtained by adding an automatic operation correcting command outputted from the learning module and the operator command outputted from the manipulator 2 to the automatic operating command as the operating command. When learning, the learning module associates the command obtained by adding the automatic operation correcting command to the operator command with the position data (rotation angle) and the force data (the detection value of the force sensor 19) of the end effector 17 of the robot body 1 to carry out a machine learning. Moreover, during operation, when the current position data and force data of the end effector 17 of the robot body 1 are inputted, the learning module outputs the automatic operation correcting command corresponding to the input based on the machine learning until then. By this machine learning, the skill for accomplishing the given work by the operator manipulating the robot body 1 is handed down to the robot system through the actual work. Then, during this actual work, the operator is motivated by the motivation information so that he/she increases the work amount or the work speed of the robot body 1. As a result, the operator's more-advanced skill for accomplishing the given work by manipulating the robot body 1 is handed down to the robot system through the actual work.

Embodiment 7

Embodiment 7 of the present disclosure is configured so that the work imager 4 and the work image display unit 5 of any one of Embodiments 1 to 6 are omitted. The robot system of this embodiment is applied to a work environment in which the operator can manipulate the robot body 1 while visually confirming, from near the robot body 1, the work performed by the robot body 1. Such a work environment includes a work environment in which a person and the robot work collaboratively.

Other Embodiments

Although in Embodiments 1 to 5 the two articles are fitted together as the given work, the given work may be any work, as long as it can obtain an appropriate result by the person manipulating the robot, rather than the robot automatically performing the work. For example, the given work includes welding and painting which is difficult to be automated.

Moreover, in any one of Embodiments 1 to 5, the motivation information acquiring module 44 may generate either "the number of works" or "the work speed," and may send it to the motivation information presenter 6.

Moreover, in any one of Embodiments 1 to 6, the reflection of the force data to the manipulator 2 may be omitted.

Moreover, in Embodiment 4, instead of the robot system 300B of Embodiment 2, the robot system 300A of Embodiment 1, the robot system 300C of Embodiment 3, or the robot system 300E of Embodiment 5 may be corrected to the configuration using the second communication apparatus 61 and the third communication apparatus 62.

Moreover, in Embodiment 4, the manipulation instrument group 71 may be provided in an area in the factory far away from the area where the work instrument group 72 is provided.

In any one of Embodiments 2 to 4 and 7, similar to Embodiment 5, the selector 7 may be provided, and the robot controlling module 41 may be configured as illustrated in FIG. 10.

Moreover, in any one of Embodiments 2 to 4 and 7, the robot controlling module 41 may be configured similar to Embodiment 6.

It is apparent for the person skilled in the art that many improvements and other embodiments are possible from the above description. Therefore, the above description is to be interpreted only as illustration.

INDUSTRIAL APPLICABILITY

The robot system of the present disclosure is useful as a robot system in which the operator can demonstrate his/her manipulation capability as much as possible.

DESCRIPTION OF REFERENCE CHARACTERS

1 Robot Body
2 Manipulator
3 Controller
4 Work Imager
5 Work Image Display Unit
6 Motivation Information Presenter
7 Selector
10 Robot

17 End Effector
19 Force Sensor
41 Robot Controlling Module
42 Manipulator Controlling Module
43 Display Controlling Module
44 Motivation Information Acquiring Module
45 Work Acquiring Module
46 Motivation Information Generating Module
47 Start-of-work Detector
48 End-of-work Detector
51 First Communication Apparatus
52 Communication Network
61 Second Communication Apparatus
62 Third Communication Apparatus
63 Communication Network
71 Manipulation Instrument Group
72 Work Instrument Group
81 First Article
82 Second Article
112 Corrective Operation Program Generating Module
113 Program Storing Module
114 Automatic Commanding Module
115 Command Switching Module
116 Adjusting Module
300A-300E Robot System

The invention claimed is:

1. A robot system, comprising:
a robot body configured to perform a work;
a start-of-work detector configured to detect a start of the work when an end effector of the robot body is located above the start-of-work detector;
an end-of-work detector configured to detect an end of the work when the end effector of the robot body is located above the end-of-work detector;
a processor programmed to:
control operation of the robot body according to a command of an operator; and
acquire, based on information from the start-of-work and end-of work detectors, at least one of an amount of work performed by the robot body and a speed of work performed by the robot body; and
a motivation information presenter configured to present to the operator the acquired at least one of the amount of work and the speed of work.

2. The robot system of claim 1, wherein the work performed by the robot body is a given work performed repeatedly.

3. The robot system of claim 1, wherein the motivation information presenter is also configured to present at least one of:
a yield that is a total manufacturing retail price or a total manufacturing amount of articles produced by the work performed by the robot body;
a wage to be paid for the total manufacturing amount of articles produced by the work performed by the robot body;
a position given to the operator who has achieved a given high level in the amount of work or the speed of work performed by the robot body;
a title for praising a large amount of work or a high speed of work performed by the robot body;
a sound effect that changes according to the amount of work or the speed of work performed by the robot body and reminds the operator about money;
an image that changes according to the amount of work or the speed of work performed by the robot body and reminds the operator about money; and a ranking of the amount of work and the speed of work performed by the robot body of an arbitrary one of a plurality of the robot systems.

4. The robot system of claim 1, wherein a robot including the robot body and the processor has:
   a manual mode in which the processor is programmed to control the operation of the robot body according to the operator command;
   an automatic mode in which the processor is programmed to control the operation of the robot body according to a given operation program; and
   a correctable automatic mode in which the processor is programmed to control the operation of the robot body according to the operator command and the given operation program, and
   wherein the processor is programmed to correct the given operation program so as to reflect the operator command in the correctable automatic mode and to use the corrected given operation program thereafter in the correctable automatic mode, instead of the given operation program.

5. The robot system of claim 1, wherein the processor is further programmed to:
   output an automatic operating command according to a basic operation program;
   output an automatic operation correcting command based on machine learning; and
   add the automatic operating command, the automatic operation correcting command, and the operator command and output an operating command, and
   wherein the processor carries out the machine learning by associating (i) a command obtained by adding the automatic operating command to the operator command with (ii) position data of the end effector of the robot body and data of a force applied to the end effector.

6. The robot system of claim 1, further comprising:
   a work imager configured to image the work performed by the robot body; and
   a work image display configured to display a work image that is an image of the work performed by the robot body imaged by the work imager.

7. The robot system of claim 6, further comprising a communication network through which transmission of the operator command to the processor, transmission of the work image from the work imager to the work image display, and transmission of the motivation information from the processor to the motivation information presenter are performed.

8. The robot system of claim 1, wherein each of the start-of-work detector and the end-of-work detector is a proximity sensor or a contact sensor that detects the end effector of the robot body.

9. The robot system of claim 1, wherein the motivation information presenter is configured to present to the operator both the amount of work performed by the robot body and the speed of work performed by the robot body.

10. A method for operating a robot system,
   the robot system comprising:
   a robot body configured to perform a work;
   a start-of-work detector configured to detect a start of the work when an end effector of the robot body is located above the start-of-work detector; and
   an end-of-work detector configured to detect an end of the work when the end effector of the robot body is located above the end-of-work detector, and
   the method comprising:

controlling operation of the robot body according to a command of an operator;
acquiring, based on information from the start-of-work and end-of work detectors, at least one of an amount of work performed by the robot body and a speed of work performed by the robot body; and
presenting to the operator the acquired at least one of the amount of work and the speed of work.

11. The method of claim 10, wherein the work performed by the robot body is a given work performed repeatedly.

12. The method of claim 10, further comprising presenting to the operator at least one of:
   a yield that is a total manufacturing retail price or a total manufacturing amount of articles produced by the work performed by the robot body;
   a wage to be paid for the total manufacturing amount of articles produced by the work performed by the robot body;
   a position given to the operator who has achieved a given high level in the amount of work or the speed of work performed by the robot body;
   a title for praising a large amount of work or a high speed of work performed by the robot body;
   a sound effect that changes according to the amount of work or the speed of work performed by the robot body and reminds the operator about money;
   an image that changes according to the amount of work or the speed of work performed by the robot body and reminds the operator about money; and
   a ranking of the amount of work and the speed of work performed by the robot body of an arbitrary one of a plurality of the robot systems.

13. The method of claim 10, wherein a robot including the robot body and a processor has:
   a manual mode in which the processor is programmed to control the operation of the robot body according to the operator command;
   an automatic mode in which the processor is programmed to control the operation of the robot body according to a given operation program; and
   a correctable automatic mode in which the processor is programmed to control the operation of the robot body according to the operator command and the given operation program, and
   wherein the method further comprises correcting the given operation program so as to reflect the operator command in the correctable automatic mode and using the corrected given operation program thereafter in the correctable automatic mode, instead of the given operation program.

14. The method of claim 10, further comprising:
   outputting an automatic operating command according to a basic operation program;
   outputting an automatic operation correcting command based on machine learning; and
   adding the automatic operating command, the automatic operation correcting command, and the operator command and outputting an operating command,
   wherein the machine learning is carried out by associating (i) a command obtained by adding the automatic operating command to the operator command with (ii) position data of the end effector of the robot body and data of a force applied to the end effector.

15. The method of claim 10, further comprising displaying on a work image display a work image that is an image of the work performed by the robot body.

16. The robot system of claim 15, further comprising transmitting (i) the operator command to a processor, (ii) the work image from a work imager to the work image display, and (iii) the motivation information from the processor to a motivation information presenter.

17. The method of claim 10, wherein each of the start-of-work detector and the end-of-work detector is a proximity sensor or a contact sensor that detects the end effector of the robot body.

18. The method of claim 10, comprising presenting to the operator both the amount of work performed by the robot body and the speed of work performed by the robot body.

19. A non-transitory computer-readable medium storing instructions for controlling a processor of a robot system, the robot system comprising:

a robot body configured to perform a work;

a start-of-work detector configured to detect a start of the work when an end effector of the robot body is located above the start-of-work detector; and an end-of-work detector configured to detect an end of the work when the end effector of the robot body is located above the end-of-work detector, and when executed by the processor of the robot system, the stored instructions causing the processor to:

control operation of the robot body according to a command of an operator;

acquire, based on information from the start-of-work and end-of work detectors, at least one of an amount of work performed by the robot body and a speed of work performed by the robot body; and present to the operator the acquired at least one of the amount of work and the speed of work.

20. The non-transitory computer-readable medium of claim 19, wherein the stored instructions cause the processor to present to the operator both the amount of work performed by the robot body and the speed of work performed by the robot body.

* * * * *